Nov. 13, 1956  F. F. RODONI  2,770,153
KNIFE SHARPENER
Filed Sept. 27, 1955

INVENTOR.
Francis F. Rodoni
BY
Att'y

United States Patent Office 2,770,153
Patented Nov. 13, 1956

2,770,153

KNIFE SHARPENER

Francis F. Rodoni, San Francisco, Calif.

Application September 27, 1955, Serial No. 537,023

1 Claim. (Cl. 76—89.1)

This invention relates to improvements in knife sharpeners and has particular reference to a device for serrating the cutting edge of a knife.

The principal object of this invention is to provide a simple device wherein the cutting edge of a knife may be serrated by a simple downward movement of a multiple cutting unit.

A further object is to produce a device of this character which is easy to use one which is economical to manufacture and one which is neat in appearance.

Other objects and advantages will be apparent during the course of the following description.

In the accompanying drawings forming a part of this specification and in which like numbers are employed to designate like parts throughout the same, Fig. 1 is a perspective view of my knife sharpener;

Figure 1:
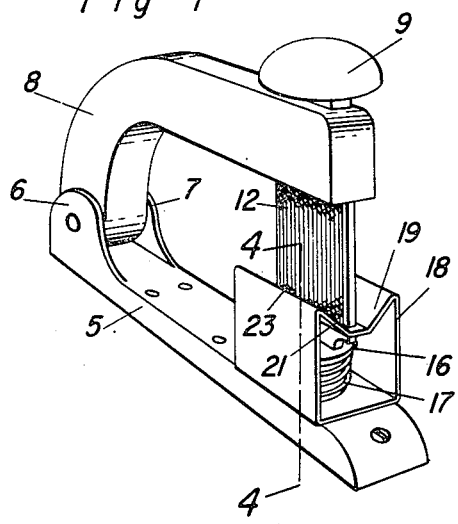
Figure 2:
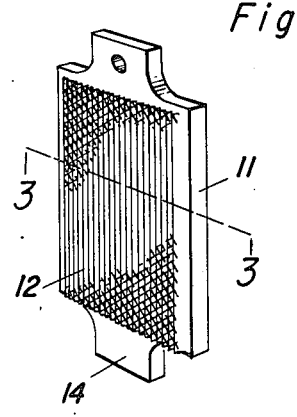
Fig. 2 is a perspective view of the cutting element.
Figure 4:
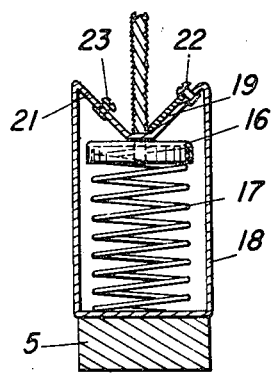
Fig. 4 is a cross sectional view, partly in elevation, taken on the line 4—4 of Fig. 1.

It is a well known fact that by forming a serrated edge on the edge of an ordinary table knife, the same becomes a knife with which meat and other hard to cut edibles may be readily sliced. This is not possible with the ordinary so-called dull table knife.

Applicant has therefore devised a simple mechanism for serrating the edge of a knife.

In the accompanying drawings, wherein for the purpose of illustration is shown a preferred embodiment of my invention, the numeral 5 designates a base having upstanding arms 6 and 7 to which is pivoted an L-shaped arm 8 having a handle 9.

Attached to the free end of the L-shaped lever 8, is a cutting element 11 which has a series of vertically arranged file-like surfaces as shown at 12 and 13. The lower end of this element has a reduced portion forming a lug 14, which passes through a plate 16 mounted on the upper coil of a spring 17 mounted on the base 5 and enclosed in a guide rest 18.

This guide rest has two downwardly and inwardly inclined bearing surfaces shown at 19 and 21. At 22 and 23 I have shown adjustable bolts which are slidable in slots formed in the guide surfaces 19 and 21 respectively, the purpose of which is to act as points against which the back of a knife is placed.

Figure 5:
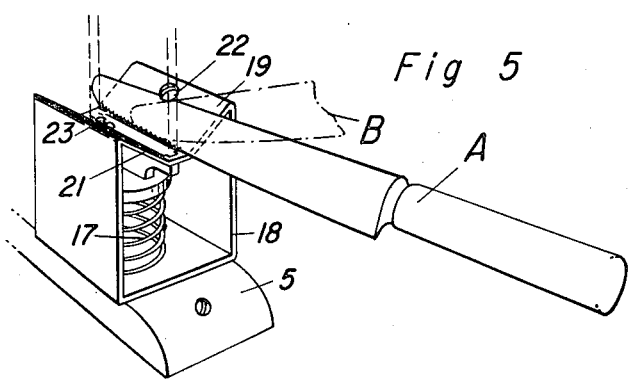
Fig. 5 is a fragmentary perspective view, showing the knife in sharpening position.
Figure 3:
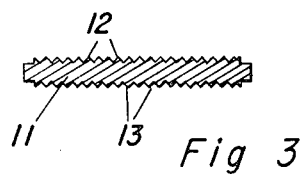
Fig. 3 is a cross sectional view taken on the line 3—3 of Fig. 2.

The result of this construction is that when a knife is placed in the position shown at A in Fig. 5, the back of the knife will bear against the bolt 23, thus forcing the blade of the knife against the file-like surface of the cutting element 11.

By now striking a downward blow on the handle 9, the teeth of the file will pass downwardly against the inclined edge of the knife and cause a series of serrations to be formed thereon. By tipping the knife to the position B, serrations may be made around the curved end of the knife. Then by removing the knife and placing it on the opposite side of the device, the opposite edge of the knife may be readily serrated in the manner just described.

It will thus be seen that my invention will accomplish all of the objects above set forth. It is to be understood that the form of my invention herewith shown and described is to be taken as a preferred example of the same, and that various changes relative to the material, size, shape and arrangement of parts may be resorted to without departing from the spirit of the invention or the scope of the subjoined claim.

Having thus described my invention, I claim:

In a device for forming serrations on the edge of a knife, a base member, a member pivoted to said base and having a portion thereof parallel to said base, a cutting element carried by and suspended from said pivoted member, a spring mounted on said base and supporting the free end of said cutter, a guide rest mounted on said base, said guide having a pair of inwardly inclined bearing surfaces positioned on opposite sides of said cutter, said rest having a slot therethrough to guide said cutter in an up and down movement, and fulcrum means carried by said inclined surfaces whereby a knife may be forced against said cutter.

References Cited in the file of this patent

UNITED STATES PATENTS

| 794,810 | Massa | July 18, 1905 |
| 1,576,091 | Chantry | Mar. 9, 1926 |